(12) United States Patent
Ohashi

(10) Patent No.: US 11,546,517 B2
(45) Date of Patent: Jan. 3, 2023

(54) DRIVE DEVICE INCLUDING MAGNET UNITS ARRANGED IN HALBACH ARRAY, SHAKE CORRECTION DEVICE, AND IMAGE CAPTURING APPARATUS

(71) Applicant: CANON KABUSHIKI KAISHA, Tokyo (JP)

(72) Inventor: Kaishi Ohashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 172 days.

(21) Appl. No.: 17/171,247

(22) Filed: Feb. 9, 2021

(65) Prior Publication Data
US 2021/0258489 A1    Aug. 19, 2021

(30) Foreign Application Priority Data
Feb. 14, 2020   (JP) .............................. JP2020-023623

(51) Int. Cl.
| | |
|---|---|
| *H04N 5/232* | (2006.01) |
| *H01F 7/20* | (2006.01) |
| *H01F 7/02* | (2006.01) |
| *H04N 5/225* | (2006.01) |

(52) U.S. Cl.
CPC ....... *H04N 5/23287* (2013.01); *H01F 7/0205* (2013.01); *H01F 7/20* (2013.01); *H04N 5/2253* (2013.01)

(58) Field of Classification Search
CPC .... H04N 5/2251–22521; H04N 5/2253–2254; H04N 5/2257; H04N 5/23248–23287; G02B 27/64; G02B 27/646; G03B 2205/00–0084; H01F 3/00–14; H01F 7/00–206; H01F 13/00–006
See application file for complete search history.

(56) References Cited

U.S. PATENT DOCUMENTS

| | | | |
|---|---|---|---|
| 2018/0241293 A1* | 8/2018 | Miyazaki | ................ B06B 1/045 |
| 2019/0068042 A1* | 2/2019 | Kimura | ............... H04N 5/23287 |
| 2021/0306565 A1* | 9/2021 | Karibe | ............... H04N 5/23258 |
| 2022/0103053 A1* | 3/2022 | Ho | ........................ H04N 5/2254 |

FOREIGN PATENT DOCUMENTS

| | | | |
|---|---|---|---|
| CN | 105429411 A | * | 3/2016 |
| CN | 111865028 A | * | 10/2020 |
| JP | 2019095540 A | | 6/2019 |

* cited by examiner

*Primary Examiner* — Paul M Berardesca
(74) *Attorney, Agent, or Firm* — Rossi, Kimms & McDowell LLP

(57) ABSTRACT

A drive device capable of reducing a possibility that magnets or contact members are broken by repulsive forces generated between magnets arranged in the Halbach array. The drive device includes magnet units each including a plurality of permanent magnets arranged in the Halbach array and a holding member that holds the permanent magnets, a fixed portion, a movable portion that is movable with respect to the fixed portion, and coils. The magnet units are supported by one of the fixed portion and the movable portion. The coils are supported by the other of the fixed portion and the movable portion in a manner opposed to the magnet units, respectively. The holding member has elastic shape portions in contact with the permanent magnets on surfaces thereof opposed to the permanent magnets in a magnet arrangement direction of the permanent magnets arranged in the Halbach array.

17 Claims, 8 Drawing Sheets

DRIVE DEVICE INCLUDING MAGNET UNITS ARRANGED IN HALBACH ARRAY, SHAKE CORRECTION DEVICE, AND IMAGE CAPTURING APPARATUS

BACKGROUND OF THE INVENTION

Field of the Invention

The present invention relates to a drive device including magnet units arranged in the Halbach array, a shake correction device that drives an image capturing device, and an image capturing apparatus including the shake correction device.

Description of the Related Art

Conventionally, there has been known a camera (hereinafter referred to as the "image capturing apparatus") equipped with a shake correction device.

Examples of literature related to the image capturing apparatus equipped with the shake correction device include Japanese Laid-Open Patent Publication (Kokai) No. 2019-095540. Japanese Laid-Open Patent Publication (Kokai) No. 2019-095540 discloses a shake correction device that forms a voice coil motor by a combination of coils and permanent magnets and corrects a shake by moving a movable portion including an image capturing device relative to a fixed portion. Further, Japanese Laid-Open Patent Publication (Kokai) No. 2019-095540 discloses a technique for increasing a magnetic force passing through the coils by employing the Halbach array as the array of the permanent magnets, and thereby increasing an electromagnetic force when electric current is caused to flow through the coils to improve a driving thrust. According to the technique disclosed in Japanese Laid-Open Patent Publication (Kokai) No. 2019-095540, it is possible to reduce a current value for obtaining the necessary driving thrust and save power consumed by the image capturing apparatus.

However, the above-described conventional technique has the following problem: In the magnets arranged in the Halbach array, a repulsive force is generated between the magnets adjacent to each other. This repulsive force applies stress to the magnets and a member in contact with the magnets, which may break the member or the magnets.

SUMMARY OF THE INVENTION

The present invention provides a drive device that is capable of reducing a possibility that magnets or contact members are broken due to repulsive forces generated between magnets arranged in the Halbach array, a shake correction device that drives an image capturing device, and an image capturing apparatus equipped with the shake correction device.

In a first aspect of the present invention, there is provided a drive device including magnet units each including a plurality of permanent magnets that are arranged in the Halbach array and a holding member that holds the permanent magnets, a fixed portion, a movable portion that is movable with respect to the fixed portion, and coils, wherein the magnet units are supported by one of the fixed portion and the movable portion, wherein the coils are supported by the other of the fixed portion and the movable portion such that the coils are opposed to the magnet units, and wherein the holding member has elastic shape portions in contact with the permanent magnets, on surfaces thereof opposed to the permanent magnets in a magnet arrangement direction of the permanent magnets arranged in the Halbach array.

In a second aspect of the present invention, there is provided a shake correction device that drives an image capturing device, wherein the shake correction device comprises magnet units each including a plurality of permanent magnets that are arranged in the Halbach array and a holding member that holds the permanent magnets, a fixed portion, a movable portion that is movable with respect to the fixed portion and includes the image capturing device, and coils, wherein the magnet units are supported by one of the fixed portion and the movable portion, wherein the coils are supported by the other of the fixed portion and the movable portion such that the coils are opposed to the magnet units, and wherein the holding member has elastic shape portions in contact with the permanent magnets, on surfaces thereof opposed to the permanent magnets in a magnet arrangement direction of the permanent magnets arranged in the Halbach array.

In a third aspect of the present invention, there is provided an image capturing apparatus including a shake correction device that drives an image capturing device, wherein the shake correction device comprises magnet units each including a plurality of permanent magnets that are arranged in the Halbach array and a holding member that holds the permanent magnets, a fixed portion, a movable portion that is movable with respect to the fixed portion and includes an image capturing device, and coils, wherein the magnet units are supported by one of the fixed portion and the movable portion, wherein the coils are supported by the other of the fixed portion and the movable portion such that the coils are opposed to the magnet units, and wherein the holding member has elastic shape portions in contact with the permanent magnets, on surfaces thereof opposed to the permanent magnets in a magnet arrangement direction of the permanent magnets arranged in the Halbach array.

According to the present invention, repulsive forces generated by the magnets arranged in the Halbach array are absorbed and relieved by the elastic shape portions, and hence in the drive device having the magnets arranged in the Halbach array, the shake correction device, and the image capturing apparatus, it is possible to reduce a possibility that magnets or contact members are broken by the repulsive forces generated between the magnets.

Further features of the present invention will become apparent from the following description of exemplary embodiments (with reference to the attached drawings).

BRIEF DESCRIPTION OF THE DRAWINGS

FIG. 9 is a perspective view of a magnet unit 105a.

DESCRIPTION OF THE EMBODIMENTS

The present invention will now be described in detail below with reference to the accompanying drawings showing embodiments thereof. Note that in the present embodiment, a drive device according to the present invention will be described as a shake correction device that drives an image capturing device of an image capturing apparatus.

Figure 1A:
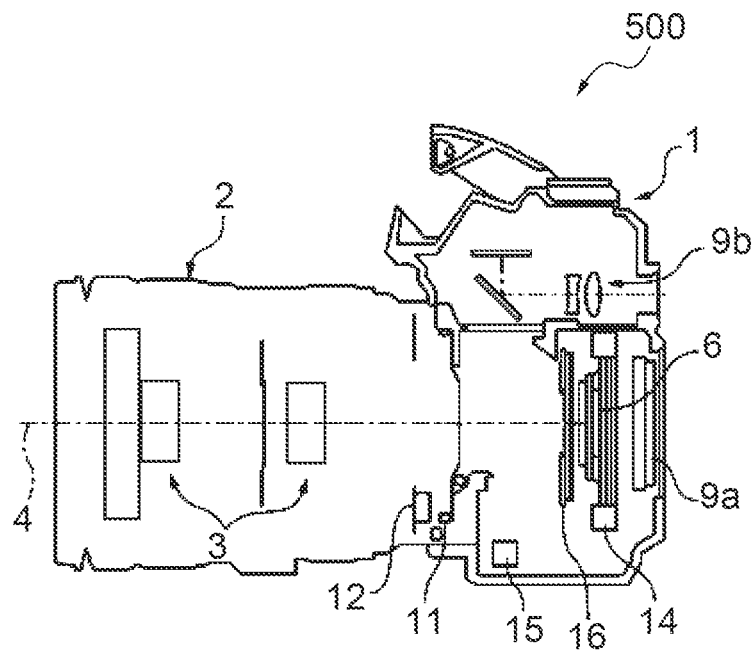
FIG. 1A is a cross-sectional view of an image capturing apparatus equipped with a shake correction device to which a drive device according to an embodiment is applied.
Figure 1B:
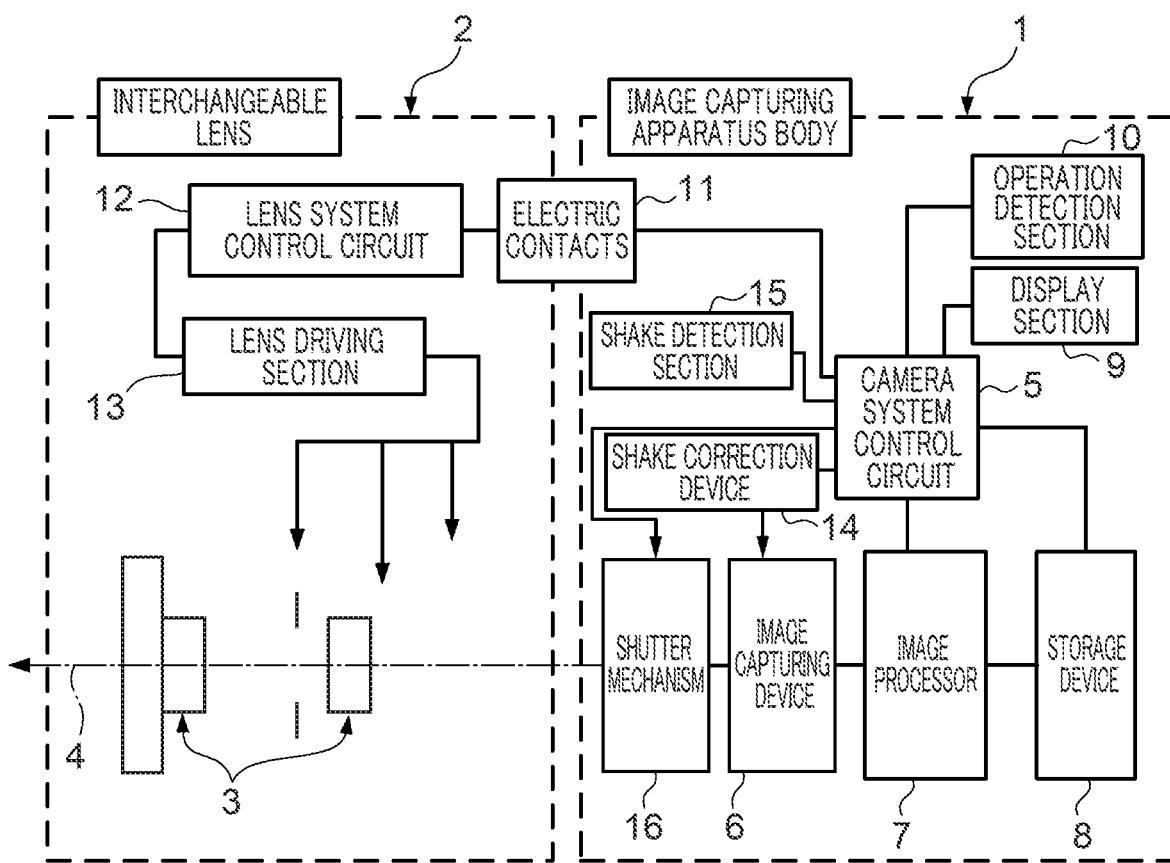
FIG. 1B is a block diagram showing hardware configuration of the image capturing apparatus shown in FIG. 1A.

FIGS. 1A and 1B are diagrams showing the image capturing apparatus equipped with the shake correction device to which the drive device according to the embodiment is applied. FIG. 1A is a cross-sectional view showing a schematic configuration of the image capturing apparatus, and FIG. 1B is a block diagram showing a functional configuration of the image capturing apparatus.

Referring to FIG. 1A, the image capturing apparatus, denoted by reference numeral 500, includes an image capturing apparatus body 1 and an interchangeable lens 2 that is removably attached to the image capturing apparatus body 1.

Referring to FIG. 1B, the image capturing apparatus body 1 includes a camera system control circuit 5. The camera system control circuit 5 is connected to an image processor 7, a storage device 8, a display section 9, an operation detection section 10, an image-shake correction device (hereinafter referred to as the "shake correction device") 14, a shake detection section 15, and a shutter mechanism 16. The display section 9 includes an in-viewfinder display device 9a and a rear display panel 9b (see FIG. 1A). Further, the camera system control circuit 5 is connected to an image capturing device 6 via the shake correction device 14.

The interchangeable lens 2 includes a lens group 3, a lens system control circuit 12, and a lens driving section 13. In a state in which the interchangeable lens 2 is attached to the image capturing apparatus body 1, the camera system control circuit 5 and the lens system control circuit 12 are communicably connected to each other via electric contacts 11.

The image capturing device 6 is fixed to a movable portion of the shake correction device 14, and the position of the image capturing device 6 is moved by driving of the shake correction device 14. The shake detection section 15 is e.g. a gyro sensor. The shake detection section 15 sends signals indicative of amounts of shake in a first direction and a second direction orthogonal to each other within a plane orthogonal to a direction of a photographing optical axis 4 to the camera system control circuit 5 (hereinafter referred to as the "optical axis direction"). Further, the shake detection section 15 detects a shake of the image capturing apparatus in a third direction, i.e. a direction of rotation about the photographing optical axis 4 within an identical plane, and sends a signal indicative of an amount of shake to the camera system control circuit 5.

The camera system control circuit 5 calculates a target position of the image capturing device 6 for reducing image blur of an object image based on the signals acquired from the shake detection section 15. Further, the camera system control circuit 5 calculates an amount of driving within a plane orthogonal to the photographing optical axis 4, for moving the image capturing device 6 to the target position, and sends the calculated driving amount to the shake correction device 14.

The shake correction device 14 is a mechanism for translating the image capturing device 6 within a plane substantially orthogonal to the photographing optical axis 4 (within a plane substantially parallel to an imaging surface of the image capturing device 6) or rotating the image capturing device 6 about the photographing optical axis 4. The shake correction device 14 moves the image capturing device 6 to the target position within a plane orthogonal to the photographing optical axis 4 by controlling energization of coils 205, described hereinafter, according to the driving amount (control signal) received from the camera system control circuit 5. With this, it is possible to reduce (correct) image blur caused by a camera shake due to a shake of a user's hand. Note that out of the members forming the image capturing apparatus, those which are not directly related to image blur correction are known components. Therefore, detailed description of them is omitted.

Next, the shake correction device 14 will be described in detail.

Figure 2:
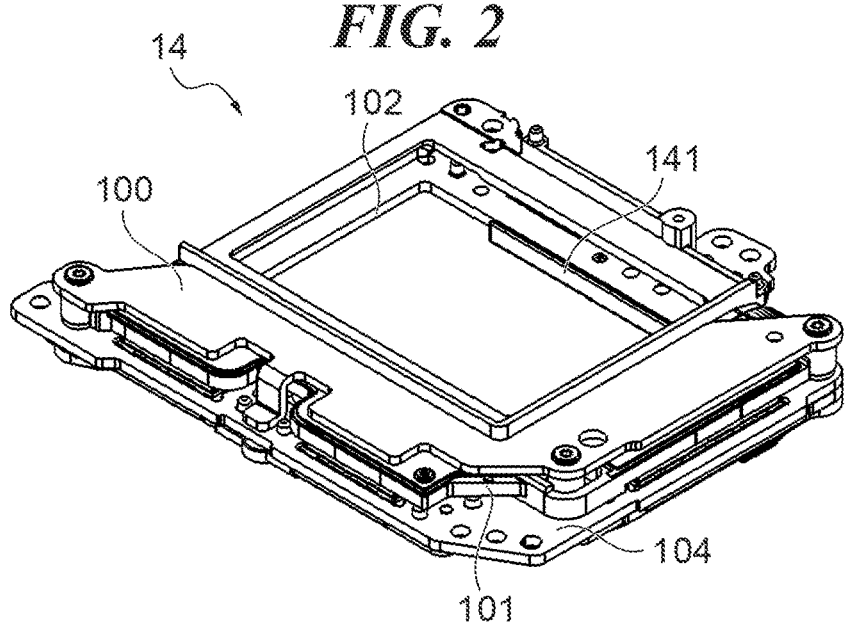
FIG. 2 is a perspective view showing the shake correction device.
Figure 3:
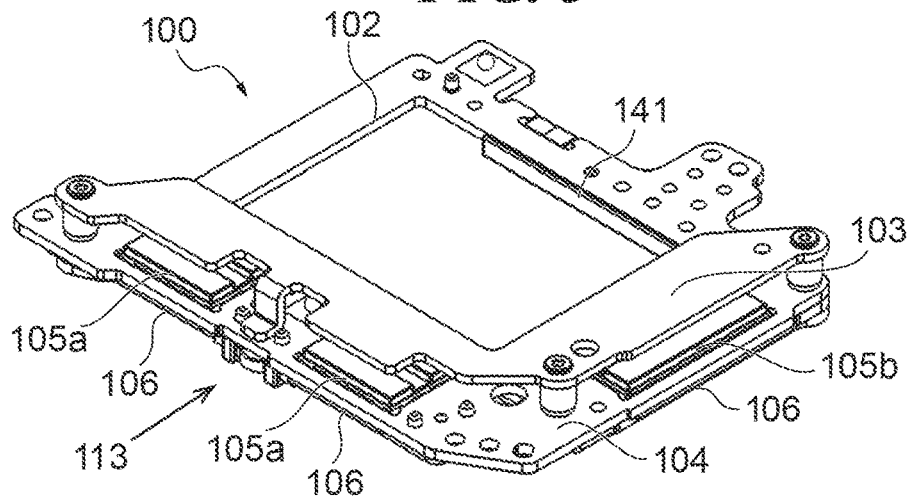
FIG. 3 is a perspective view showing a fixed portion of the shake correction device.
Figure 4:
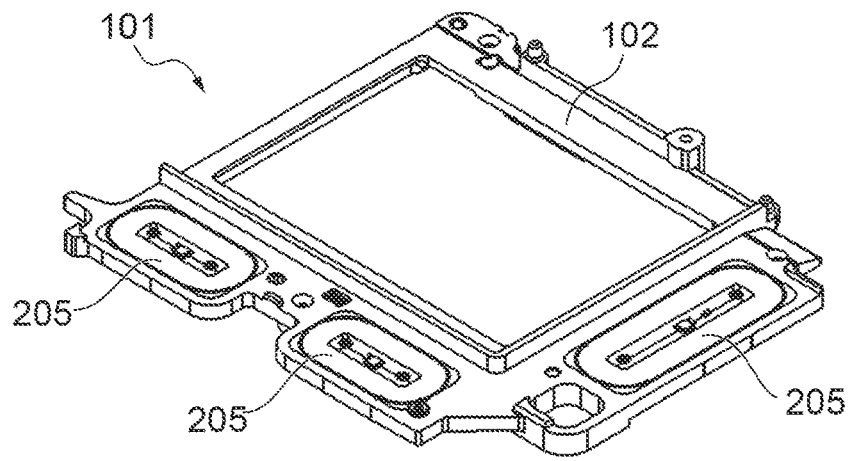
FIG. 4 is a perspective view showing a movable portion of the shake correction device.

FIG. 2 is a perspective view showing the shake correction device, FIG. 3 is a perspective view showing a fixed portion of the shake correction device, and FIG. 4 is a perspective view showing the movable portion of the shake correction device.

The fixed portion, denoted by reference numeral 100, of the shake correction device 14 is a member fixed to the image capturing apparatus body 1. That is, the shake correction device 14 is mainly formed by the fixed portion 100, shown in FIG. 3, which is fixed to the image capturing apparatus body 1, and the movable portion, denoted by reference numeral 101, shown in FIG. 4, which is configured to be movable with respect to the fixed portion 100. The image capturing device 6 (omitted from illustration in FIGS. 3 and 4) is fixed to the movable portion 101, and the shake correction device 14 is a drive device for moving the image capturing device 6 with respect to the fixed portion 100.

The fixed portion 100 of the shake correction device 14 includes permanent magnets and yokes, and the movable portion 101 includes the coils 205. The permanent magnets, the yokes, and the coils 205 form a voice coil motor. More specifically, a driving force is generated by applying electric current to the coils 205, and the image capturing device 6 (not shown) fixed to the movable portion 101 is moved with respect to the fixed portion 100. Note that the shake correction device 14 may be configured such that the fixed portion 100 includes the coils 205 and the movable portion 101 includes the permanent magnets and the yokes. That is, it is only required that the magnet units are supported by one of the fixed portion 100 and the movable portion 101 and that the coils 205 are supported by the other of the fixed portion 100 and the movable portion 101 such that the coils 205 are opposed to the magnet units.

Referring to FIG. 3, the fixed portion 100 of the shake correction device 14 includes a front yoke 103 formed of a magnetic material and a fixed member 104 formed of metal which is a non-magnetic material. The fixed member 104 is fixed to the image capturing apparatus body 1. A total of three magnet units, i.e. two magnet units 105a and one magnet unit 105b, each having permanent magnets, are mounted on the fixed member 104. A rear yoke 106 formed of a magnetic material is arranged on rear sides of the magnet units 105a and 105b.

Figure 5:
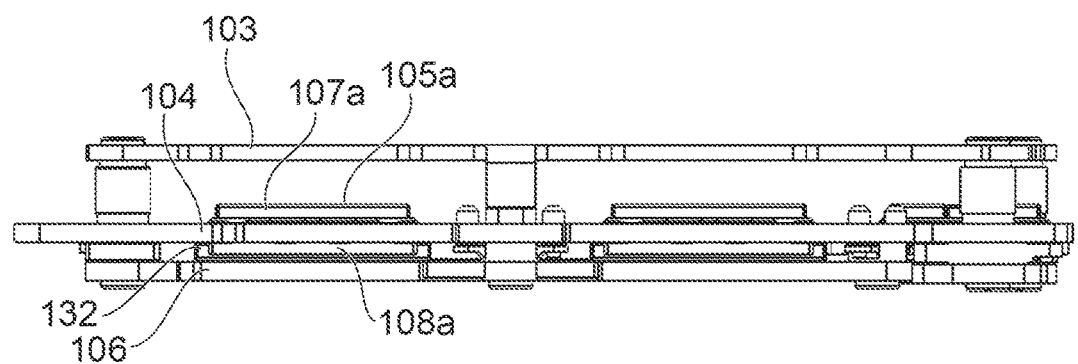
FIG. 5 is a side view as viewed from a direction indicated by an arrow 113 in FIG. 3.

FIG. 5 is a side view as viewed from a direction indicated by an arrow 113 in FIG. 3.

Referring to FIG. 5, a magnetic circuit is formed by the front yoke 103, the magnet unit 105a, and the rear yoke 106. As for the magnet unit 105b as well, similarly, a magnetic circuit is formed by the front yoke 103, the magnet unit 105b, and the rear yoke 106. Each of the coils 205 of the movable portion 101, appearing in FIG. 4, is arranged in a magnetic field generated by the magnetic circuit formed as described above. Referring to FIG. 4, the movable portion 101 has a frame 102 having a rectangular frame shape, and the image capturing device 6 (omitted from illustration in FIG. 5) is held by this frame 102.

Figure 6:
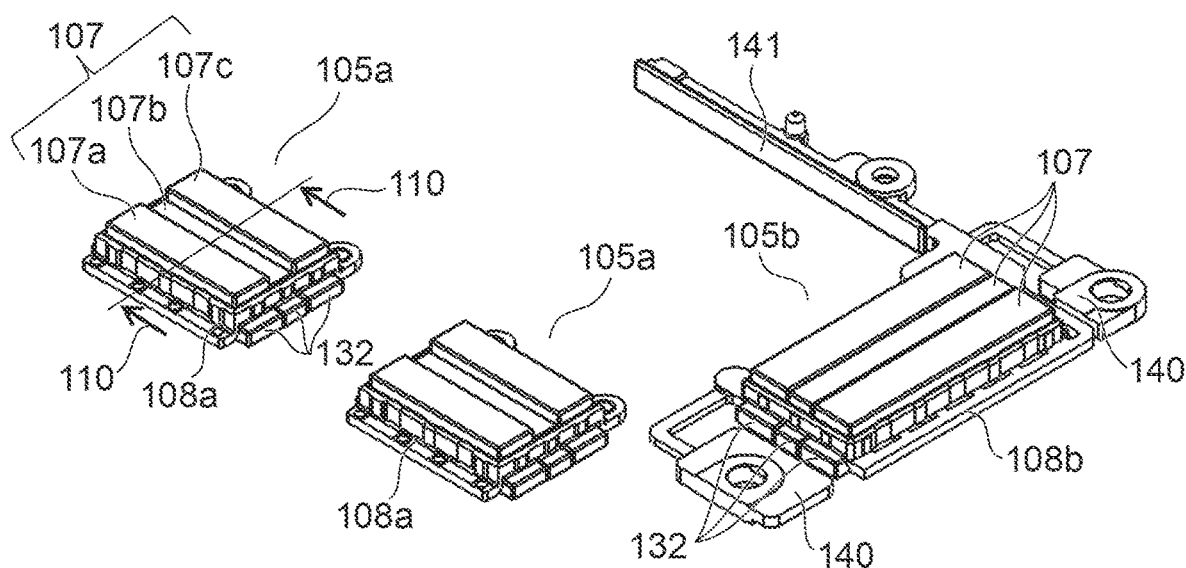
FIG. 6 is a perspective view showing magnet units.

Next, the magnet units 105 (105a and 105b) will be described. FIG. 6 is a perspective view showing the magnet units.

Referring to FIG. 6, the three magnet units 105 (105a, 105a, and 105b) are formed by three permanent magnets 107 (107a, 107b, and 107c) and respective holding members 108 (108a, 108a, and 108b) for accommodating the permanent magnets 107. The holding members 108 (108a and 108b) are each formed of a resin material which is a non-magnetic material. Each holding member 108a and the holding member 108b are different in size. In the following description, in a case where the holding member 108a and the holding member 108b are not required to be specifically distinguished, they are each generically referred to as the holding member 108. Further, in a case where the permanent magnets 107a, 107b, and 107c are not required to be specifically distinguished, they are each generically referred to as the permanent magnet 107.

Since the holding member 108 is formed of the non-magnetic material, the holding member 108 does not obstruct the magnetic circuit formed by the permanent magnet 107, the front yoke 103, and the rear yoke 106.

Figure 7:
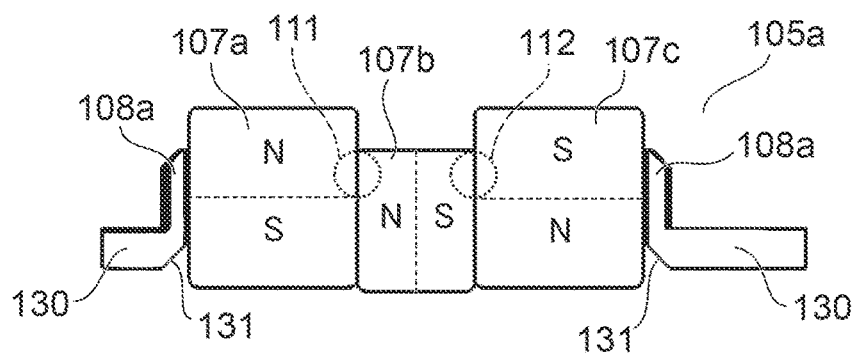
FIG. 7 is a cross-sectional view showing a magnet array of the magnet unit, as viewed from a direction indicated by an arrow 110 in FIG. 6.

FIG. 7 is a cross-sectional view showing a magnet array of the magnet unit 105a, as viewed from a direction indicated by an arrow 110 in FIG. 6. FIG. 7 shows the permanent magnets 107a, 107b, and 107c of the magnet unit 105a with their polarities N/S, and the holding member 108a that holds these permanent magnets.

Referring to FIG. 7, the permanent magnet 107a as the left-side magnet has an upper side magnetized to an N-po/le and a lower side magnetized to an S-pole. The permanent magnet 107b as the center magnet has a left side magnetized to an N-pole and a right side magnetized to an S-pole. Further, the permanent magnet 107c as the right-side magnet has an upper side magnetized to an S-pole and a lower side magnetized to an N-pole. The magnet array having this polarity arrangement is referred to as the Halbach array. By arranging the magnets in the Halbach array, it is possible to make strong the magnetic field on the upper side of the permanent magnets 107a to 107c, as viewed in FIG. 7, which increases a thrust generated by the voice coil motor.

However, the Halbach array has a problem that adjacent magnets repel each other.

More specifically, the N-pole of the permanent magnet 107a as the left-side magnet and the N-pole of the permanent magnet 107b as the center magnet are arranged adjacent to each other in FIG. 7, and a repulsive force is generated between the magnets 107a and 107b in an area indicated by a broken line (repulsion area 111). Similarly, in a repulsion area 112 between the S-pole of the permanent magnet 107c as the right-side magnet and the S-pole of the permanent magnet 107b as the center magnet, a repulsive force is also generated between the magnets 107b and 107c. With these repulsive forces, a force in a left direction, as viewed in FIG. 7, is generated in the permanent magnet 107a. Further, a force in a right direction, as viewed in FIG. 7, is generated in the permanent magnet 107c. Stress is applied between each permanent magnet and a component in contact with the magnet, such as the holding member 108, due to the repulsive force, so that there is a fear that the holding member 108 or the permanent magnet 107 itself is broken.

To prevent this, in the shake correction device 14 according to the present embodiment, the holding member 108 that holds the associated permanent magnets 107 is provided with elastic shape portions 122.

Figure 8:
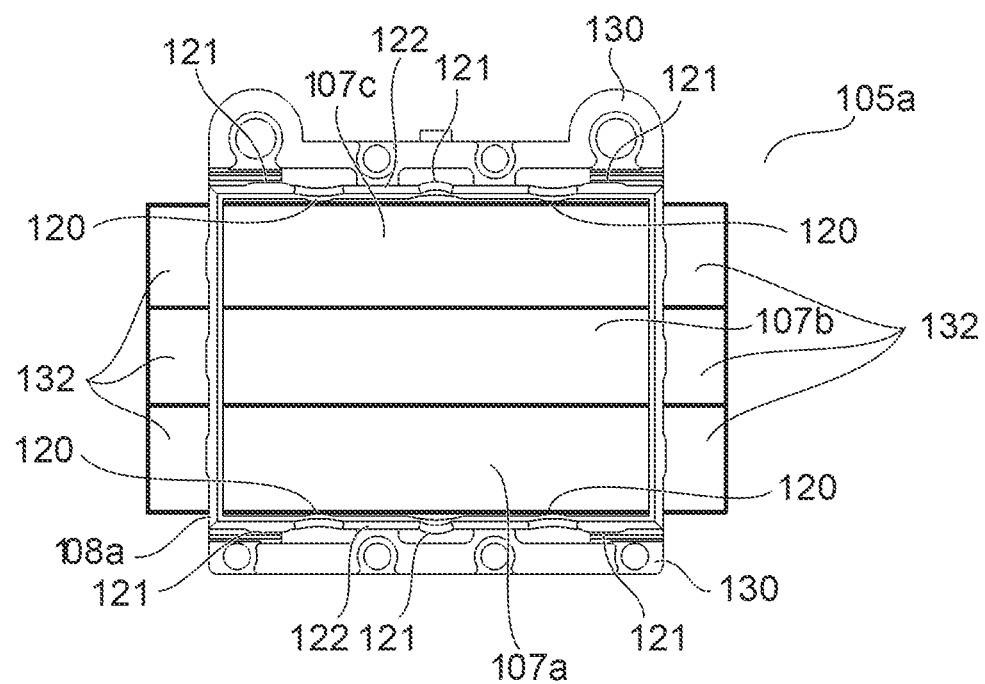
FIG. 8 is a plan view of the magnet unit shown in FIG. 7.

FIG. 8 is a plan view of the magnet unit 105a shown in FIG. 7.

Referring to FIG. 8, the holding member 108a has a rectangular frame shape and is formed of a resin material. Surfaces of the holding member 108a, which are opposed to the permanent magnets 107 in a magnet arrangement direction thereof, are formed as the elastic shape portions 122. That is, the holding member 108a is formed with a plurality of permanent magnet-contacting portions 120, which are in contact with the permanent magnet 107a or 107c, on the surfaces thereof on an inner side of the frame shape, which are opposed to the permanent magnets 107 in the magnet arrangement direction thereof. Further, the holding member 108a is formed with a plurality of fixed portion-contacting portions 121, which are in contact with the fixed portion 100, not shown, on opposite surfaces on an outer side of the frame shape to the surfaces thereof, which are opposed to the permanent magnets 107 in the magnet arrangement direction thereof. Each permanent magnet-contacting portions 120 and each fixed portion-contacting portions 121 are connected by a thinly formed portion, and an elastic shape portion 122 is formed by these portions.

The elastic shape portion 122 toward the permanent magnet 107a is formed with e.g. two permanent magnet-contacting portions 120 and three fixed portion-contacting portions 121, and the elastic shape portion 122 toward the permanent magnet 107c is also formed with e.g. two permanent magnet-contacting portions 120 and three fixed portion-contacting portions 121. Each permanent magnet-contacting portion 120 of the elastic shape portion 122 is deformable in a contacting direction (the vertical direction as viewed in FIG. 8). This enables the elastic shape portions 122 to realize cushioning action for absorbing impact caused by repulsive forces generated between the permanent magnets 107 arranged in the Halbach array.

Further, since the holding member 108a is formed of a resin material as described above, the holding member 108a has large elasticity and has an effect of damping impact. This also realizes the cushioning action. Thus, the holding member 108a reduces a fear that magnets and associated components are broken by the repulsive forces generated between the permanent magnets arranged in the Halbach array, due to the cushioning action of the elastic shape portions 122.

Although the elastic shape portion 122 is described as the portion having a thin shape, the same cushioning effect can be obtained by an elastic shape portion having a shape other than the thin shape insofar as elasticity can be obtained.

Here, the configuration for stabilizing the posture of the permanent magnets (107a, 107b, and 107c) in the magnet unit 105 will be described in detail. Stabilization of the posture of the permanent magnets (107a, 107b, and 107c) leads to improvement of the position accuracy of the permanent magnets and prevention of falling of the permanent magnets (107a, 107b, and 107c) from the holding member 108a.

First, the first merit of the holding member 108a will be described. In general, considering rotation of an object arranged within a plane, it is known that if the object is supported at not less than three points (support points), the rotating posture of the object is stabilized. In other word, it is preferable to provide at least three support points for supporting the object, and the rotating posture is not stabilized by two or less support points. The concept of supporting an object at not less than three points is also applied to the magnet unit 105a in the present embodiment.

The permanent magnet-contacting portions 120 where the holding member 108a is in contact with the permanent magnets 107 arranged in the Halbach array are provided as four portions at upper and lower locations, as viewed in FIG. 8. That is, since the permanent magnets 107 are supported by not less than three support points, the permanent magnets 107 are supported such that they are stable in the rotating posture and are prevented from rotating. Further, the number of the permanent magnet-contacting portions 120 of the elastic shape portion 122 can be increased as desired, and in this case, the number of support points for supporting the permanent magnets 107 arranged in the Halbach array is increased. Since the permanent magnets 107 are supported at more support points, the rotating posture of the permanent magnets 107 becomes more stable.

Next, the second merit of the holding member 108a will be described. The permanent magnet-contacting portions 120 of the holding member 108a are formed within areas (within projected planes) in which the repulsion areas 111 and 112, appearing in FIG. 7, are projected in the magnet arrangement direction (the right-left direction as viewed in FIG. 7) of the permanent magnets. This makes it possible to make the length of a rotation moment arm equal to zero, assuming, when considering a rotation on a plane of a drawing sheet of FIG. 8, that each permanent magnet-contacting portion 120 is a fulcrum and an associated repulsion area is a power application point. Therefore, it is also possible to realize stabilization of the rotation posture on the plane of the drawing sheet.

Here, assembling easiness obtained when inserting the magnet unit 105a into the fixed member 104 will be described.

As described above, the holding member 108a is formed with the fixed member-contacting portions 121 which are in contact with the fixed member 104 of the fixed portion 100. Further, the thinly formed portion is formed between each fixed member-contacting portions 121 and each permanent magnet-contacting portion 120 adjacent to the fixed member-contacting portion 121. This makes the fixed member-contacting portions 121 of the holding member 108a, which are in contact with the fixed member 104, deformable in the contacting directions (upward and downward directions as viewed in FIG. 8). When the magnet unit 105a is inserted into a fitting portion at a predetermined location of the fixed member 104, cushioning action can be obtained by the elastic shape portions 122 having the permanent magnet-contacting portions 120 and the fixed member-contacting portions 121. Therefore, it is possible to prevent occurrence of an inconvenience, such as scraping of the holding member 108a formed of a resin material by the fixed member 104 formed of a metallic material.

Next, another configuration for stabilizing the posture of the magnet unit 105a in the fixed member 104 will be described.

As described above, if an object is supported at not less than three support points, the rotating posture of the object is stabilized. As described above with reference to FIG. 8, the fixed member-contacting portions 121 of the holding member 108a, which are in contact with the fixed member 104, are provided e.g. at the six locations, and the holding member 108a is thus supported at not less than three support points. Therefore, the rotating posture of the magnet unit 105a protected by the holding member 108a on the plane of the drawing sheet in FIG. 8, is stabilized.

Figure 9:
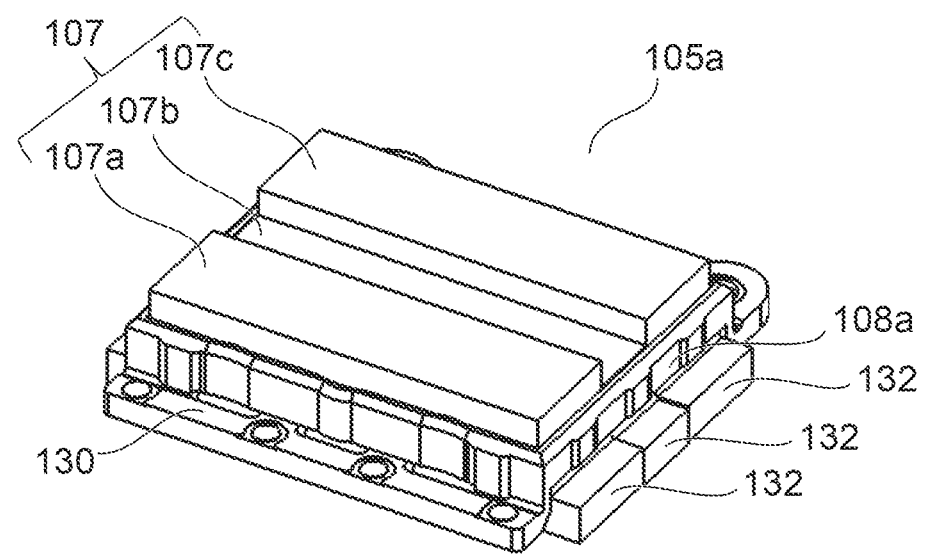
Figure 10:
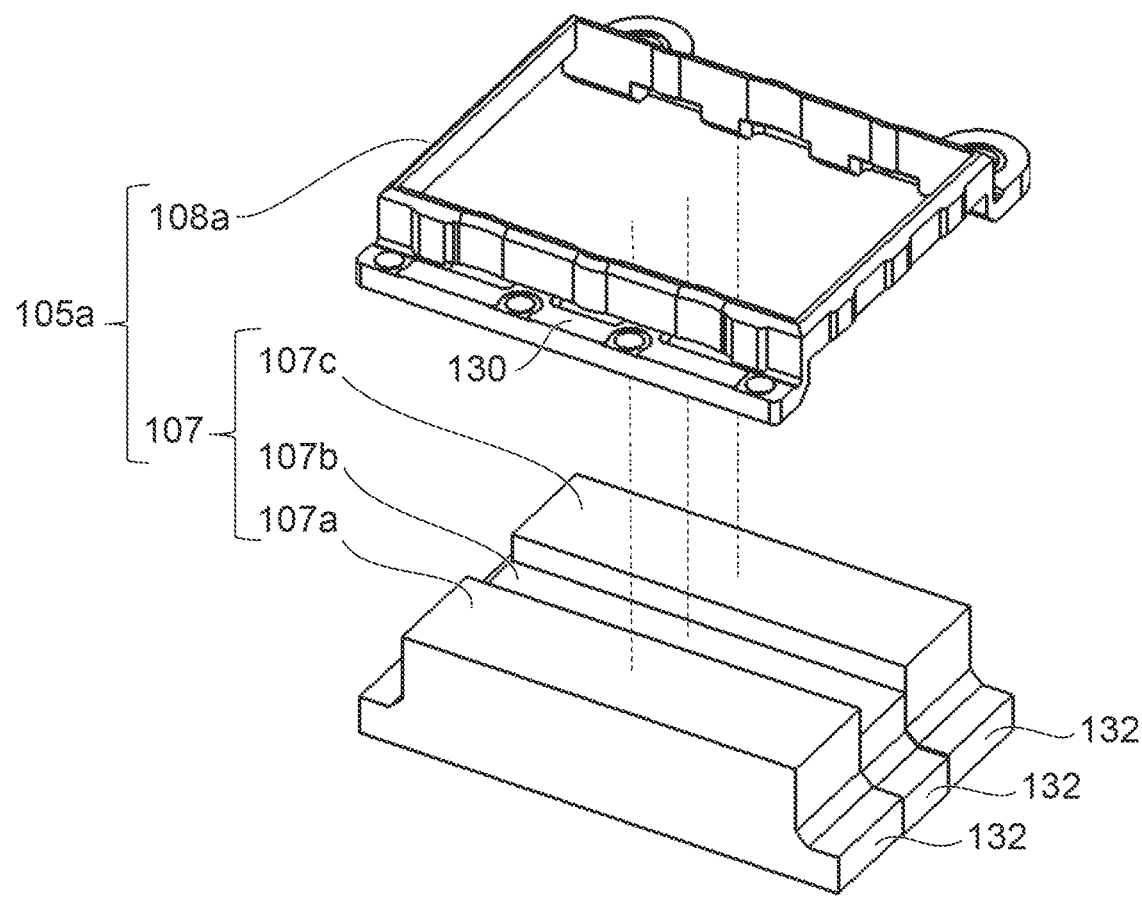
FIG. 10 is an exploded perspective view of the magnet unit.

FIG. 9 is a perspective view of the magnet unit 105a, which is useful in explaining another configuration for stabilizing the posture of the magnet unit 105a. Further, FIG. 10 is an exploded perspective view of the magnet unit 105a. Referring to FIGS. 9 and 10, the permanent magnets 107a, 107b, and 107c are each formed with flange portions 132 each projecting in a direction orthogonal to the magnet arrangement direction (longitudinal direction of the permanent magnets) of the permanent magnets.

The flange portion 132 of the permanent magnet 107a is sandwiched and held between the fixed member 104 and the rear yoke 106 (see FIG. 5), and with this, the position of the permanent magnet 107a in a thickness direction (vertical direction in FIG. 5) is fixed. Similarly, the flange portions 132 of the permanent magnets 107b and 107c are each sandwiched and held between the fixed member 104 and the rear yoke 106, and their positions in the thickness direction (vertical direction in FIG. 5) are fixed. With this arrangement, the posture of the magnet unit 105a formed by a group of permanent magnets is stabilized. Note that since the center permanent magnet 107b is adjacent to other magnets in the magnet arrangement direction, the center permanent magnet 107b can be provided with shape portions for stabilizing its posture only in directions in which the flange portion 132 protrudes, i.e. in a direction orthogonal to the magnet arrangement direction of the permanent magnets 107.

Further, as is clear from FIGS. 7, 8, 9, and 10, the holding member 108a is formed with flange portions 130 each protruding in the magnet arrangement direction in the Halbach array (the right-left direction in FIG. 7 and the vertical direction in FIG. 8). This flange portion 130 has a function of reinforcing the holding member 108a. With this, the posture of the magnet unit 105a is stabilized. Note that the flange portions 130 each function as a holding portion held or sandwiched by adhesion when the magnet unit is assembled, and hence the flange portion 130 contributes to improvement of easiness of assembly, and also makes it possible to automatically assemble the magnet unit using a robot.

The protruding direction of the flange portions 130 of the holding member 108a is different from the protruding direction of the flange portions 132 of the permanent magnets (107a, 107b, and 107c). Since the flange portions 130 protrude in the magnet arrangement direction in the Halbach array, it is possible to arrange the flange portions 130 in areas different from the areas of the above-described flange portions 132 to thereby improve the space efficiency of the magnet unit 105a, and further reduce the size of the shake correction device 14.

Further, the thickness of each flange portion 130 of the holding member 108a is thinner than the thickness of the flange portion 132 of each permanent magnet (107a, 107b, and 107c). With this, when the flange portions 132 of the permanent magnets (107a, 107b, and 107c) are sandwiched and held between the fixed member 104 and the rear yoke 106, space is generated between the fixed member 104 and the rear yoke 106 at locations where the permanent magnets do not exist. Then, the flange portions 130 of the holding member 108a can be stably accommodated in the space between the fixed member 104 and the rear yokes 106, which makes it possible to reduce the size of the shake correction device 14.

Further, as shown in FIG. 7, an inner wall surface of the holding member 108a, opposed to each flange portion 130, is formed with a chamfered shape portion 131. When the permanent magnets 107 are inserted into the holding member 108a upward from the lower side, as viewed in FIG. 7, it is possible to prevent contact between edges of the components and reduce a fear of breaking the components, by provision of the chamfered shape portions 131. Further, the chamfered shape portions 131 function as a guide used when assembling the magnet unit, and it is possible to obtain an effect of improving the assembling stability. Note that the shape of the chamfered shape portion 131 is not particularly limited, and the above-described effect can be obtained even when another inclined shape is employed. As the other inclined shape, for example, an inclined shape having a curved surface can be employed.

Next, the magnet unit 105b will be described.

In FIG. 6, as the magnet units, two types of large and small magnet units are provided, and the magnet unit 105b is different in size of the permanent magnets 107 from the magnet unit 105a. That is, the dimension of the magnet unit 105b in the direction orthogonal to the magnet arrangement direction of the permanent magnets 107 is larger than the corresponding dimension of the magnet unit 105a.

Figure 11:
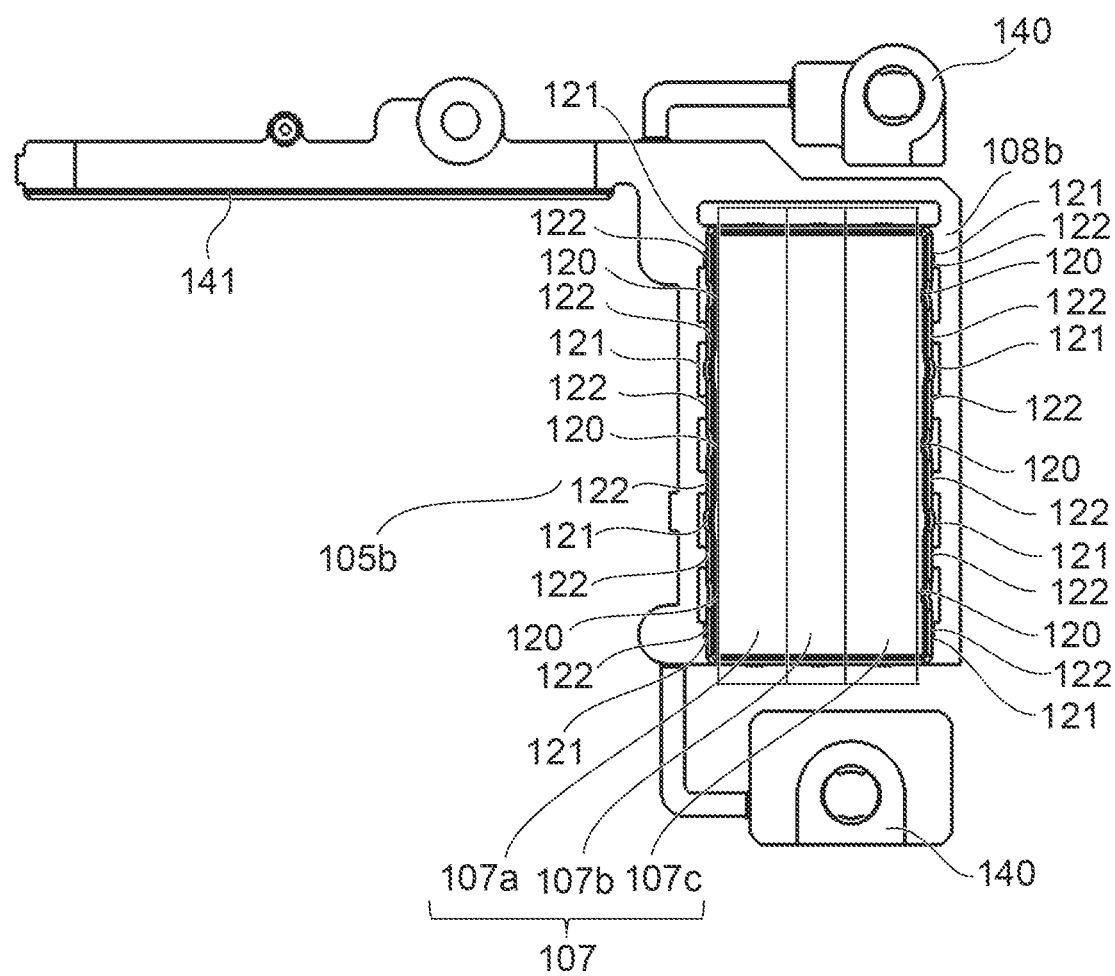
FIG. 11 is a plan view of a magnet unit 105b.
Figure 12:
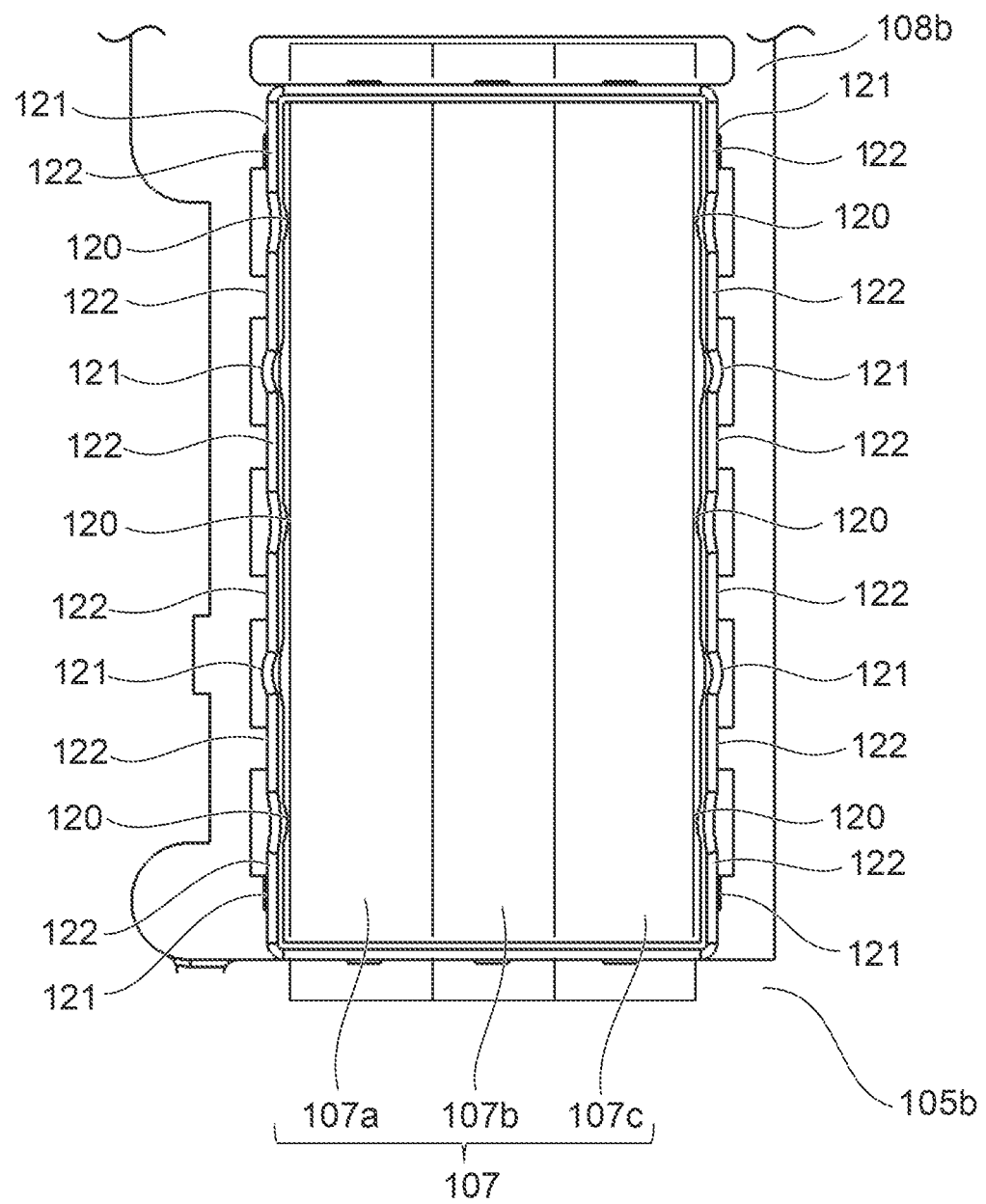
FIG. 12 is a partially enlarged view of FIG. 11.

Therefore, the holding member 108b of the magnet unit 105b has not only the function of holding the permanent magnets 107, but also the following function:

FIG. 11 is a plan view of the magnet unit 105b, and FIG. 12 is a partially enlarged view of FIG. 11.

Referring to FIGS. 11 and 12, the three permanent magnets 107a, 107b, and 107c are arranged such that their polarities are arranged in the Halbach array, similarly to the arrangement of the polarities shown in FIG. 7. The holding member 108b formed of a resin material is formed with six permanent magnet-contacting portions 120 in contact with the permanent magnets 107, and eight fixed portion-contacting portions 121 in contact with the fixed member 104, not shown therein.

Compared with the permanent magnets 107 of the magnet unit 105a, the permanent magnets 107 of the magnet unit 105b are larger in dimension in the direction orthogonal to the magnet arrangement direction of the permanent magnets 107, and hence the repulsion area generated due to the Halbach array becomes larger, and the repulsive force also becomes larger. Therefore, the number of the permanent magnet-contacting portions 120 and the number of the fixed portion-contacting portions 121 in the holding member 108b, provided for stabilizing the rotating posture of the permanent magnets 107, are larger than in the holding member 108a. This makes it possible to cope with the larger repulsive force acting on the permanent magnets adjacent to each other, and thereby obtain a sufficient cushioning effect.

Further, the holding member 108b has the following function, compared with the holding member 108a: Referring to FIG. 11, the holding member 108b has spacers 140, and each spacer 140 is formed of a resin material integrally with the holding member 108b. Each spacer 140 is made thicker than the flange portion 132 of each permanent magnet 107 (see FIG. 5). With this, when each spacer 140 is sandwiched and held between the fixed member 104 and the rear yoke 106a, space larger than the thickness of the flange portion 132 of each permanent magnet 107 is generated between the fixed member 104 and the rear yoke 106. The flange portions 132 of the permanent magnets 107 are accommodated in this space.

If the flange portions 132 of the permanent magnets 107 are directly sandwiched and held by the fixed member 104 and the rear yoke 106, repulsive forces larger than in the case of the magnet unit 105a is applied to the permanent magnets 107, and hence there is a fear that the permanent magnets themselves are broken. For this reason, the thickness of each spacer 140 made of a resin material is made thicker than the thickness of the flange portion 132, and this prevents a holding force from being applied to the flange portions 132 of the permanent magnets 107 when the magnet unit 105b is sandwiched and held between the fixed member 104 and the rear yoke 106. Further, as described above, since the spacers 140 are integrally formed with the holding member 108b, the number of components and the number of assembled components are reduced compared with a case where the spacers 140 are formed separately from the holding member 108b, which makes it possible to reduce the number of assembling steps.

Further, a FPC (flexible printed circuit) protecting portion 141 is integrally formed with the holding member 108b. The FPC protecting portion 141 is a member for protecting part of the frame 102 (see FIG. 3) of the fixed member 104 formed of metal.

Figure 13:
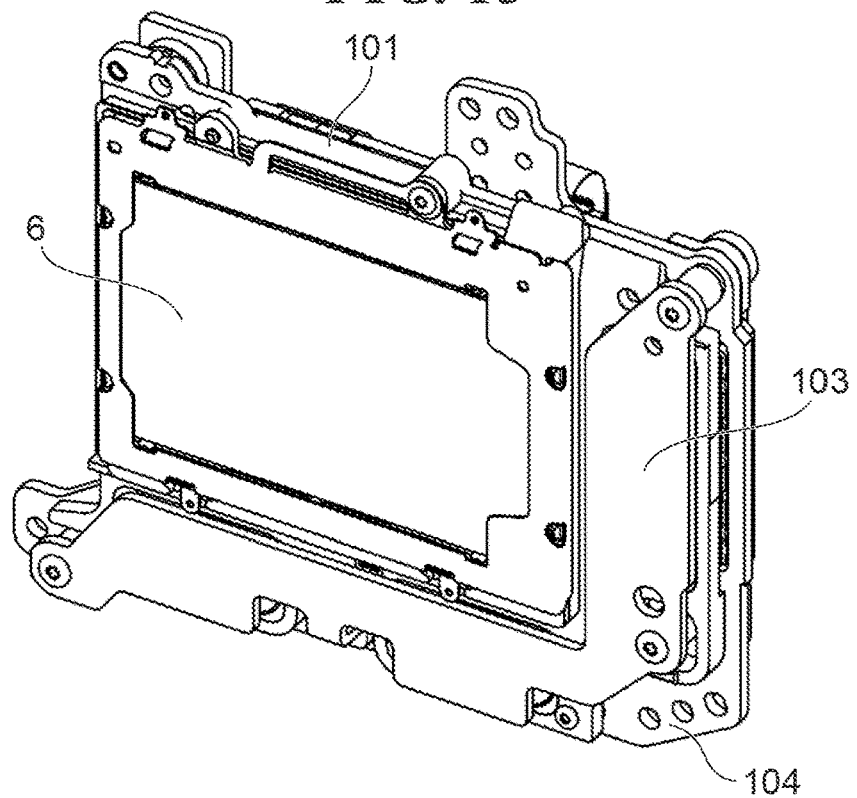
FIG. 13 is a perspective view of a front side of the shake correction device.
Figure 14:
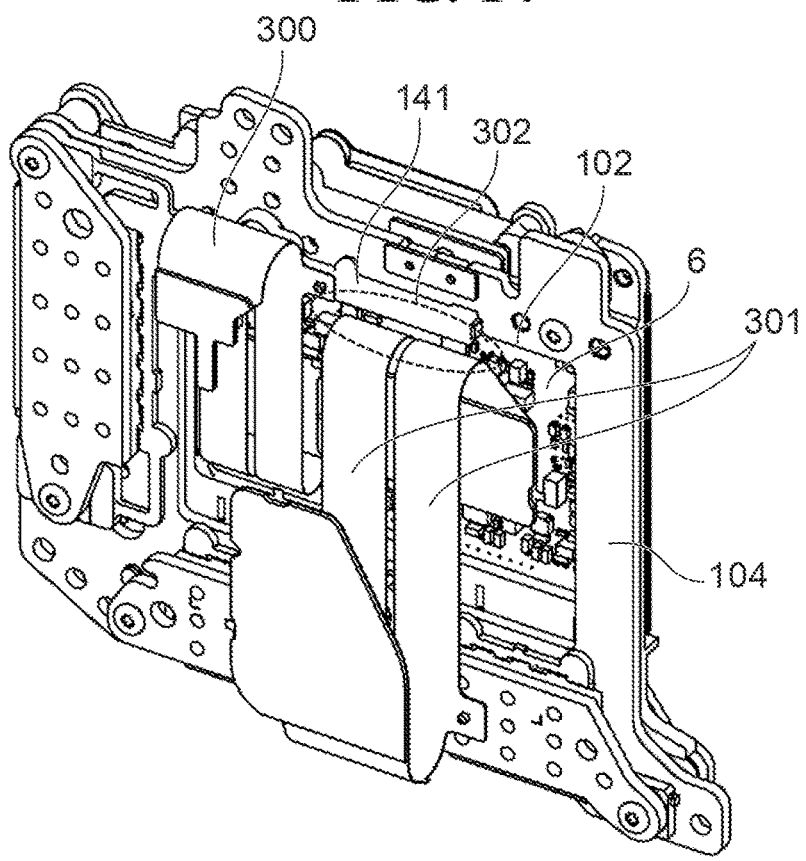
FIG. 14 is a perspective view of a rear side of the shake correction device.

FIG. 13 is a perspective view of the front side of the shake correction device 14, and FIG. 14 is a perspective view of the rear side of the shake correction device 14. Referring to FIG. 13, the image capturing device 6 is fixed to the movable portion 101. Further, referring to FIG. 14, various electric elements are arranged on the rear side of the image capturing device 6, and a power supply FPC 300 is connected to the same for supplying power to the image capturing device 6. Further, to transmit a signal output from the image capturing device 6, a signal FPC (flexible printed circuit) 301 is also connected to the rear side of the image capturing device 6.

Respective other ends of the power supply FPC 300 and the signal FPC 301, opposite from ends connected to the image capturing device 6, are connected to the camera system control circuit 5 (not shown in FIGS. 13 and 14), and are held in the connected state even when the shake correction device 14 is driven.

More specifically, when the shake correction device 14 is driven to move the movable portion 101, the signal FPC (FPC) 301 connected to the image capturing device 6 passes the vicinity of the frame 102 of the fixed member 104, i.e. a proximity area 302 indicated by a broken line in FIG. 14. In this case, if the FPC is brought into contact with the frame 102 of the fixed member 104 and slidably moved on the frame 102, the FPC may be damaged, and in a worse case, disconnection of wiring within the FPC may be caused.

Therefore, in the present embodiment, to prevent such disconnection, part of the frame 102 formed of metal, where the signal FPC 301 passes, is covered with the FPC protecting portion 141 formed of a resin material. Further, as described above, the FPC protecting portion 141 is integrally formed with the holding member 108b. With this, compared with a case where the FPC protecting portion 141 is formed separately from the holding member 108b, the number of components and the number of assembled components are reduced, and hence it is possible to reduce the number of assembling steps. Note that the power supply FPC 300 for supplying power to the image capturing device 6 is fixed to the FPC protecting portion 141. By thus fixing the power supply FPC 300, it is also possible to prevent the power supply FPC 300 from being brought into contact with the frame 102 of the fixed member 104.

According to the present embodiment, repulsive forces generated between the magnets arranged in the Halbach array are absorbed and lessened by the elastic shape portions 122 of the holding member 108, and hence in the shake correction device including the magnets arranged in the Halbach array, it is possible to reduce a possibility that magnets or associated component members are broken by the repulsive forces generated between the magnets.

Further, since the elastic shape portions for absorbing repulsive forces generated between the magnets are formed with the permanent magnet-contacting portions 120 and the fixed portion-contacting portions 121 at a plurality of locations, e.g. three or more locations, it is possible to stabilize the rotating posture of the permanent magnets arranged in the Halbach array, and further, stabilize the rotating posture of the magnet unit.

Further, since the holding member 108 of the shake correction device 14 has the elastic shape portions 122, when correcting a shake, it is possible to reduce a fear of breaking the magnet units 105 due to vibration of the magnet units 105. Further, in an image capturing apparatus as a mobile device, impact applied to the magnet units 105 e.g. due to falling can be lessened by the elastic shape portions 122 of the holding member 108, and hence it is possible to reduce a fear of breakage of the magnet units 105, etc.

Although in the present embodiment, the description is given of the shake correction device configured to move the image capturing device 6 of the image capturing apparatus, the shake correction device may be configured to move an optical element in place of the image capturing device 6.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-023623 filed Feb. 14, 2020, which is hereby incorporated by reference herein in its entirety.

What is claimed is:

1. A drive device comprising:
magnet units each including a plurality of permanent magnets that are arranged in the Halbach array and a holding member that holds the permanent magnets;
a fixed portion;
a movable portion that is movable with respect to the fixed portion; and
coils,
wherein the magnet units are supported by one of the fixed portion and the movable portion,
wherein the coils are supported by the other of the fixed portion and the movable portion such that the coils are opposed to the magnet units, and
wherein the holding member has elastic shape portions in contact with the permanent magnets, on surfaces thereof opposed to the permanent magnets in a magnet arrangement direction of the permanent magnets arranged in the Halbach array.

2. The drive device according to claim 1, wherein the elastic shape portions are each formed with a plurality of contact portions in contact with the permanent magnets.

3. The drive device according to claim 2, wherein the contact portions are provided at at least three locations.

4. The drive device according to claim 2, wherein the contact portions are each formed within a projected plane onto which an area where adjacent permanent magnets in the magnet unit repel each other is projected in the permanent magnet arrangement direction.

5. The drive device according to claim 1, wherein the elastic shape portions are each formed with a plurality of contact portions in contact with one of the fixed portion for supporting the magnet units and the movable portion.

6. The drive device according to claim 5, wherein the contact portions are provided at at least three location.

7. The drive device according to claim 1, wherein the holding member is formed with a flange portion protruding outward in the magnet arrangement direction on a surface opposed to one of the fixed portion and the movable portion.

8. The drive device according to claim 7, wherein an inner wall portion of the holding member, which is opposed to the flange portion, is formed with a chamfered portion.

9. The drive device according to claim 1, wherein the permanent magnet is formed with a flange portion protruding from the holding member in a direction orthogonal to the magnet arrangement direction.

10. The drive device according to claim 9, wherein a thickness of the flange portion of the holding member is thinner than a thickness of the flange portion of the permanent magnet.

11. The drive device according to claim 1, wherein the holding member is formed of a non-magnetic material.

12. The drive device according to claim 1, wherein the holding member is formed of a resin material.

13. The drive device according to claim 2, wherein the magnet units comprise two types of magnet units which are large and small, and the number of contact portions included in the holding member of the large magnet unit is larger than the number of contact portions included in the holding member of the small magnet unit.

14. The drive device according to claim 1, wherein one of the fixed portion and the movable portion includes the magnet units, and a front yoke and a rear yoke arranged above and below the magnet units, and
wherein a voice coil motor is formed by the magnet units, the front yoke and the rear yoke, and coils of the other of the fixed portion and the movable portion.

15. The drive device according to claim 14, wherein a driving force is generated by applying electric current to the coils, and the movable portion is moved with respect to the fixed portion.

16. A shake correction device that drives an image capturing device, wherein the shake correction device comprises:
magnet units each including a plurality of permanent magnets that are arranged in the Halbach array and a holding member that holds the permanent magnets;
a fixed portion;
a movable portion that is movable with respect to the fixed portion and includes the image capturing device; and
coils,
wherein the magnet units are supported by one of the fixed portion and the movable portion,
wherein the coils are supported by the other of the fixed portion and the movable portion such that the coils are opposed to the magnet units, and
wherein the holding member has elastic shape portions in contact with the permanent magnets, on surfaces thereof opposed to the permanent magnets in a magnet arrangement direction of the permanent magnets arranged in the Halbach array.

17. An image capturing apparatus including a shake correction device that drives an image capturing device, wherein the shake correction device comprises:
- magnet units each including a plurality of permanent magnets that are arranged in the Halbach array and a holding member that holds the permanent magnets;
- a fixed portion;
- a movable portion that is movable with respect to the fixed portion and includes an image capturing device; and
- coils,
- wherein the magnet units are supported by one of the fixed portion and the movable portion,
- wherein the coils are supported by the other of the fixed portion and the movable portion such that the coils are opposed to the magnet units, and
- wherein the holding member has elastic shape portions in contact with the permanent magnets, on surfaces thereof opposed to the permanent magnets in a magnet arrangement direction of the permanent magnets arranged in the Halbach array.

* * * * *